United States Patent
Doran

(10) Patent No.: US 7,266,230 B2
(45) Date of Patent: Sep. 4, 2007

(54) METHOD OF PROVIDING AN INDICATION OF QUALITY OF A DOCUMENT IMAGE AND AN APPARATUS THEREFOR

(75) Inventor: Wayne M. Doran, Kitchener (CA)

(73) Assignee: NCR Corporation, Dayton, OH (US)

( * ) Notice: Subject to any disclaimer, the term of this patent is extended or adjusted under 35 U.S.C. 154(b) by 722 days.

(21) Appl. No.: 10/315,850

(22) Filed: Dec. 10, 2002

(65) Prior Publication Data
US 2004/0109596 A1    Jun. 10, 2004

(51) Int. Cl.
*G06K 9/00* (2006.01)
(52) U.S. Cl. ...................................... 382/137
(58) Field of Classification Search ............... 382/137, 382/139
See application file for complete search history.

(56) References Cited

U.S. PATENT DOCUMENTS

| 5,193,121 A * | 3/1993 | Elischer et al. ............. 382/138 |
| 5,201,010 A * | 4/1993 | Deaton et al. .............. 382/139 |
| 5,235,652 A * | 8/1993 | Nally ......................... 382/112 |
| 5,631,984 A * | 5/1997 | Graf et al. .................. 382/317 |
| 5,748,780 A * | 5/1998 | Stolfo ........................ 382/232 |
| 6,097,834 A * | 8/2000 | Krouse et al. .............. 382/137 |
| 6,243,501 B1 * | 6/2001 | Jamali ........................ 382/305 |
| 6,574,377 B1 * | 6/2003 | Cahill et al. ................ 382/305 |
| 2002/0118871 A1 * | 8/2002 | Jones et al. ................ 382/137 |
| 2003/0023557 A1 * | 1/2003 | Moore ......................... 705/50 |
| 2003/0059098 A1 * | 3/2003 | Jones et al. ................ 382/135 |
| 2003/0219122 A1 * | 11/2003 | Ramirez et al. .............. 380/54 |
| 2004/0071333 A1 * | 4/2004 | Douglas et al. ............. 382/137 |
| 2005/0071283 A1 * | 3/2005 | Randle et al. ................ 705/75 |

* cited by examiner

*Primary Examiner*—Matthew C. Bella
*Assistant Examiner*—Tom Y Lu
(74) *Attorney, Agent, or Firm*—Michael Chan

(57) ABSTRACT

A method of providing an indication of quality of an image of a document comprises the steps of (a) storing apriori data which is representative of a line contained in at least one field associated with the document, (b) receiving image data which is representative of the image of the document, (c) retrieving the stored apriori data based upon a first portion of the document image data, (d) comparing a second portion of the document image data with the retrieved apriori data, (e) providing an indication of quality of the image of the document based upon the comparison of the second portion of the document image data with the retrieved apriori data, and (f) processing the status signal to alert an operator of quality of the image of the document being below a predetermined threshold.

14 Claims, 7 Drawing Sheets

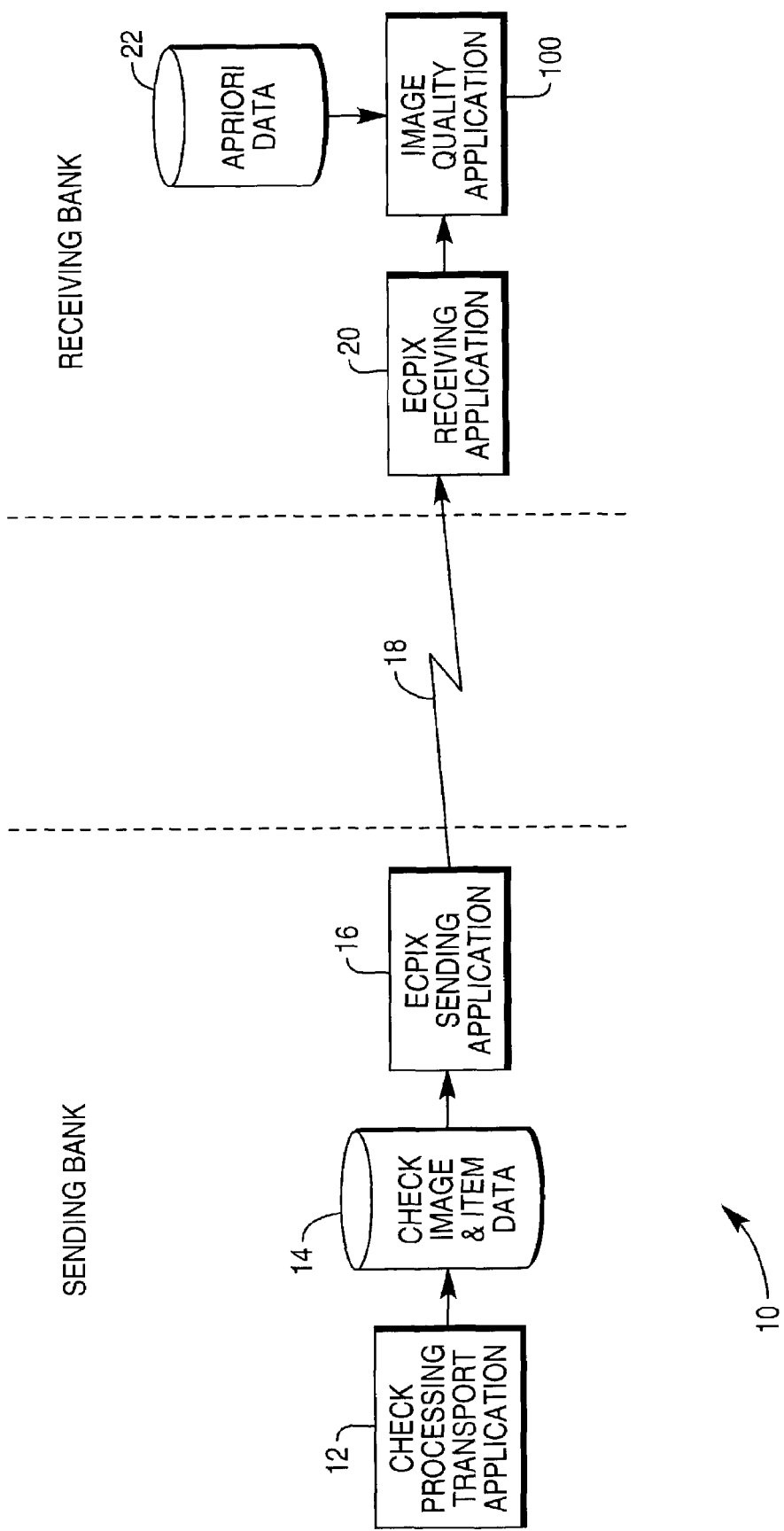

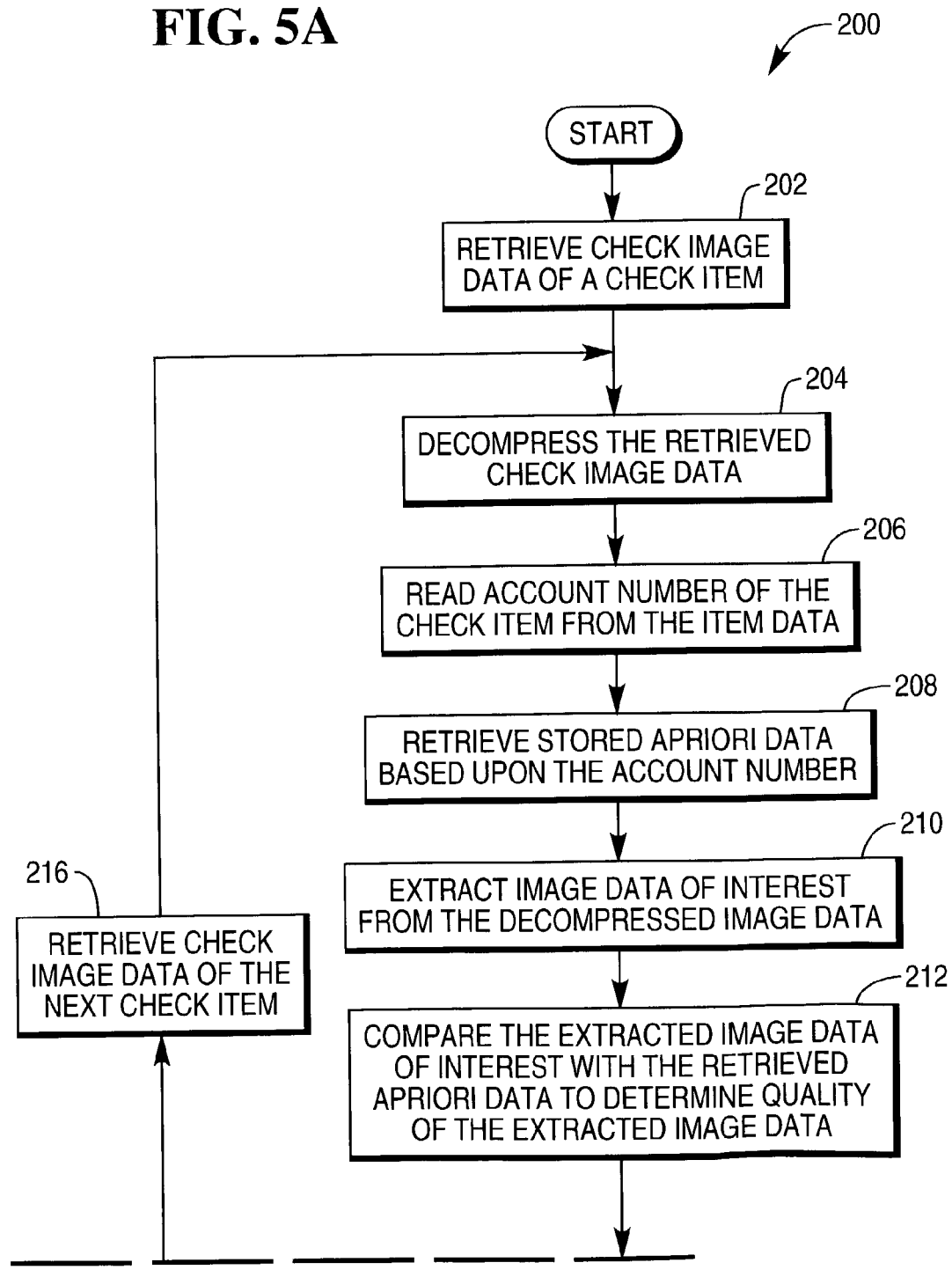

METHOD OF PROVIDING AN INDICATION OF QUALITY OF A DOCUMENT IMAGE AND AN APPARATUS THEREFOR

BACKGROUND OF THE INVENTION

The present invention relates to quality of document images, and is particularly directed to a method of providing an indication of quality of a document image, such as a check image, and an apparatus therefor.

A check imaging application in which quality of an image of a check is of concern is when a check image is electronically transferred from a sending bank to a receiving bank for check clearing purposes. In this check imaging application, the receiving bank wants to ensure that the electronically transferred check image is of sufficient quality for the intended use before accepting the check image from the sending bank. Another type of check imaging application in which quality of an image of a check is of concern is when a receiving bank receives a physical check from a sending bank and then processes that check to capture an image of the check. In this check imaging application, the receiving bank wants to ensure that the captured check image is of sufficient quality for the intended use before processing the check image any further, such as storing the check image in a check image archive. Still another type of check imaging application in which quality of an image of a check is of concern is when a bank desires to retrieve a check image from a check image archive. The check image may be retrieved from the check image archive for a number of different purposes. For example, the check image may be retrieved for the purpose of printing the check image onto an advice letter to be sent to a bank customer. In this check imaging application, the bank wants to ensure that the check image retrieved from the check image archive is of sufficient quality before printing the check image onto the advice letter to be sent to the bank customer.

The above check imaging applications are typical check imaging applications in which quality of an image of a check is of concern. Quality of an image of a check may also be of concern in other types of check imaging applications. It would be desirable to have a method of providing an indication of quality of an image of a check in many types of check imaging applications.

SUMMARY OF THE INVENTION

In accordance with one aspect of the present invention, a method of processing a check comprises the steps of (a) storing apriori data which is representative of certain features of the check, (b) receiving image data which is representative of an image of the check, (c) retrieving the stored apriori data based upon a first portion of the check image data, (d) comparing a second portion of the check image data with the retrieved apriori data, and (e) providing a status signal indicative of quality of the image of the check based upon the comparison of the second portion of the check image data with the retrieved apriori data. Step (a) may include the step of storing apriori data which is representative of a line contained in at least one field associated with the check, storing apriori data which is representative of alphanumeric text contained in at least one field associated with the check, storing apriori data which is representative of only alphabetic text contained in at least one field associated with the check, or storing apriori data which is representative of only numeric text contained in at least one field associated with the check. The method may further comprise the step of (f) processing the status signal to alert an operator of quality of the image of the check being below a predetermined threshold.

In accordance with another aspect of the present invention, an apparatus is provided for processing a check. The apparatus comprises means for storing apriori data which is representative of certain features of the check, means for receiving image data which is representative of an image of the check, means for retrieving the stored apriori data based upon a first portion of the check image data, means for comparing a second portion of the check image data with the retrieved apriori data, and means for providing a status signal indicative of quality of the image of the check based upon the comparison of the second portion of the check image data with the retrieved apriori data. The storing means may include means for storing apriori data which is representative of a line contained in at least one field associated with the check, means for storing apriori data which is representative of alphanumeric text contained in at least one field associated with the check, means for storing apriori data which is representative of only alphabetic text contained in at least one field associated with the check, or means for storing apriori data which is representative of only numeric text contained in at least one field associated with the check. The apparatus may further comprise means for processing the status signal to alert an operator of quality of the image of the check being below a predetermined threshold.

In accordance with still another aspect of the present invention, a method of providing an indication of quality of an image of a document comprises the steps of (a) storing apriori data which is representative of a line contained in at least one field associated with the document, (b) receiving image data which is representative of the image of the document, (c) retrieving the stored apriori data based upon a first portion of the document image data, (d) comparing a second portion of the document image data with the retrieved apriori data, (e) providing an indication of quality of the image of the document based upon the comparison of the second portion of the document image data with the retrieved apriori data, and (f) processing the status signal to alert an operator of quality of the image of the document being below a predetermined threshold.

In accordance with yet another aspect of the present invention, an apparatus is provided for providing an indication of quality of an image of a document. The apparatus comprises means for storing apriori data which is representative of alphanumeric text contained in at least one field associated with the document, means for receiving image data which is representative of the image of the document, means for retrieving the stored apriori data based upon a first portion of the document image data, means for comparing a second portion of the document image data with the retrieved apriori data, means for providing an indication of quality of the image of the document based upon the comparison of the second portion of the document image data with the retrieved apriori data, and means for processing the status signal to alert an operator of quality of the image of the document being below a predetermined threshold.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic block diagram showing an electronic check presentment application which embodies the present invention;

DETAILS OF THE INVENTION

Figure 2A:
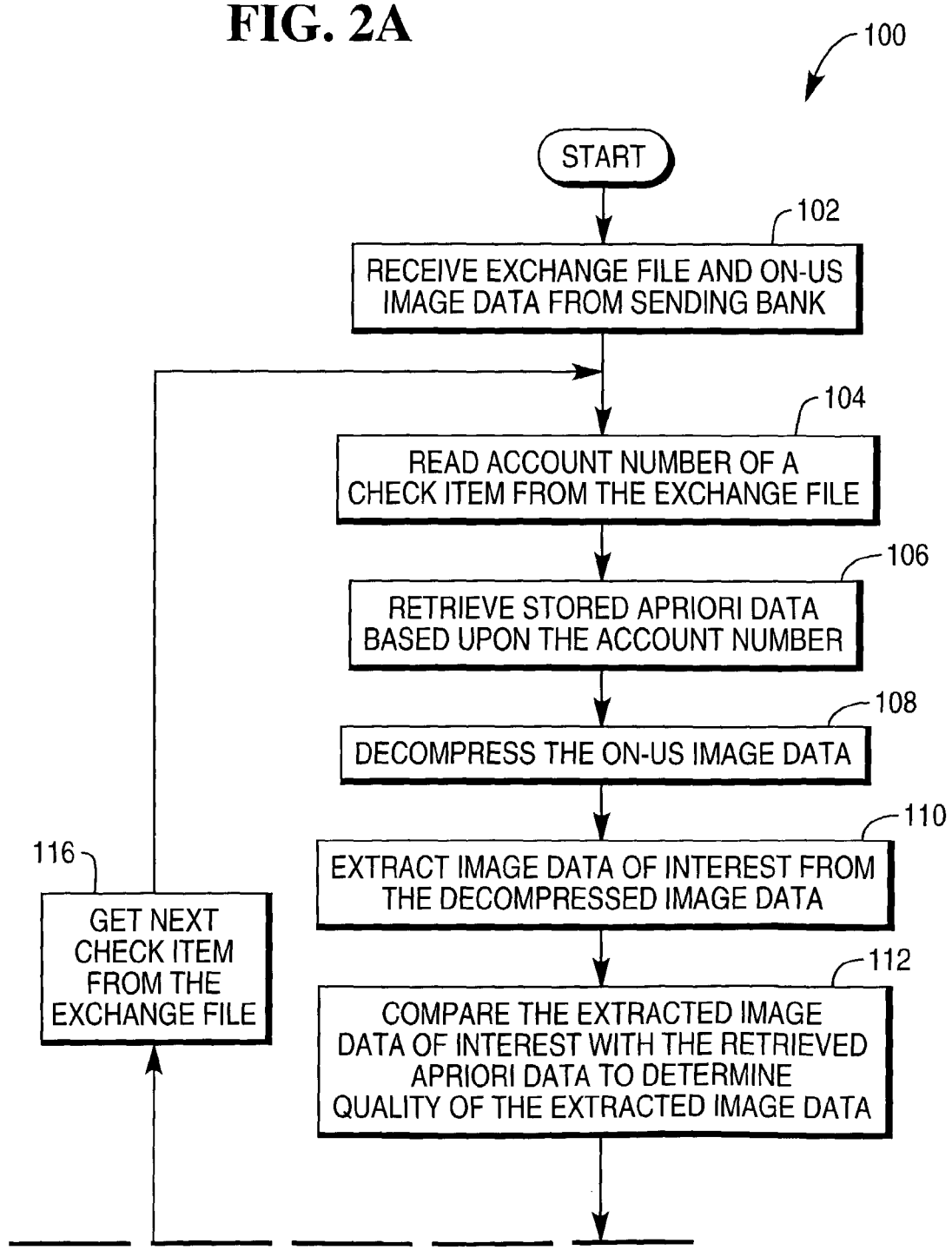
FIG. 2 is a flowchart depicting a program for providing an indication of quality of a check image in the electronic check presentment application of FIG. 1.

The present invention is directed to a method of providing an indication of quality of a document image, such as a check image, and an apparatus therefor. The check may be of any type, such as a check of the personal type, a check of the business type, or a check of the government type.

Referring to FIG. 1, an electronic check presentment (referred to herein as "ECP") application 10 is illustrated in which a check processing transport application program 12 at a sending bank controls a check processing transport (not shown) to process checks in a known manner to provide check image data which is representative of images of the checks which have been processed. The check image data which is representative of check images is stored in check image and item data memory 14. An ECP with image interchange (referred to herein as "ECPIX") sending application program 16 then retrieves check image data from the memory 14 and processes the retrieved data to provide an ECPIX presentment file for transmitting via a communications network 18 to a receiving bank.

At the receiving bank, an ECPIX receiving application program 20 receives the ECPIX presentment file transmitted from the sending bank. The ECPIX receiving application program 20 processes data contained in the ECPIX presentment file to reconstitute the check image data which is representative of check images which have been transmitted from the sending bank to the receiving bank. The ECPIX sending application program 16 and the ECPIX receiving application program 20 cooperate together to transfer check images from the sending bank to the receiving bank. The check images are usually images of checks which are "On-Us" checks of the particular receiving bank, and which checks have been deposited at the particular sending bank. After the ECPIX receiving application program 20 reconstitutes the check image data which is representative of check images which have been transmitted from the sending bank to the receiving bank, an image quality application program 100 processes the reconstituted check image data to determine if the check image data meets certain minimum quality standards. The receiving bank makes this determination to ensure that each of the transferred check images is of sufficient quality for the intended use before accepting the check image from the sending bank.

Figure 2B:
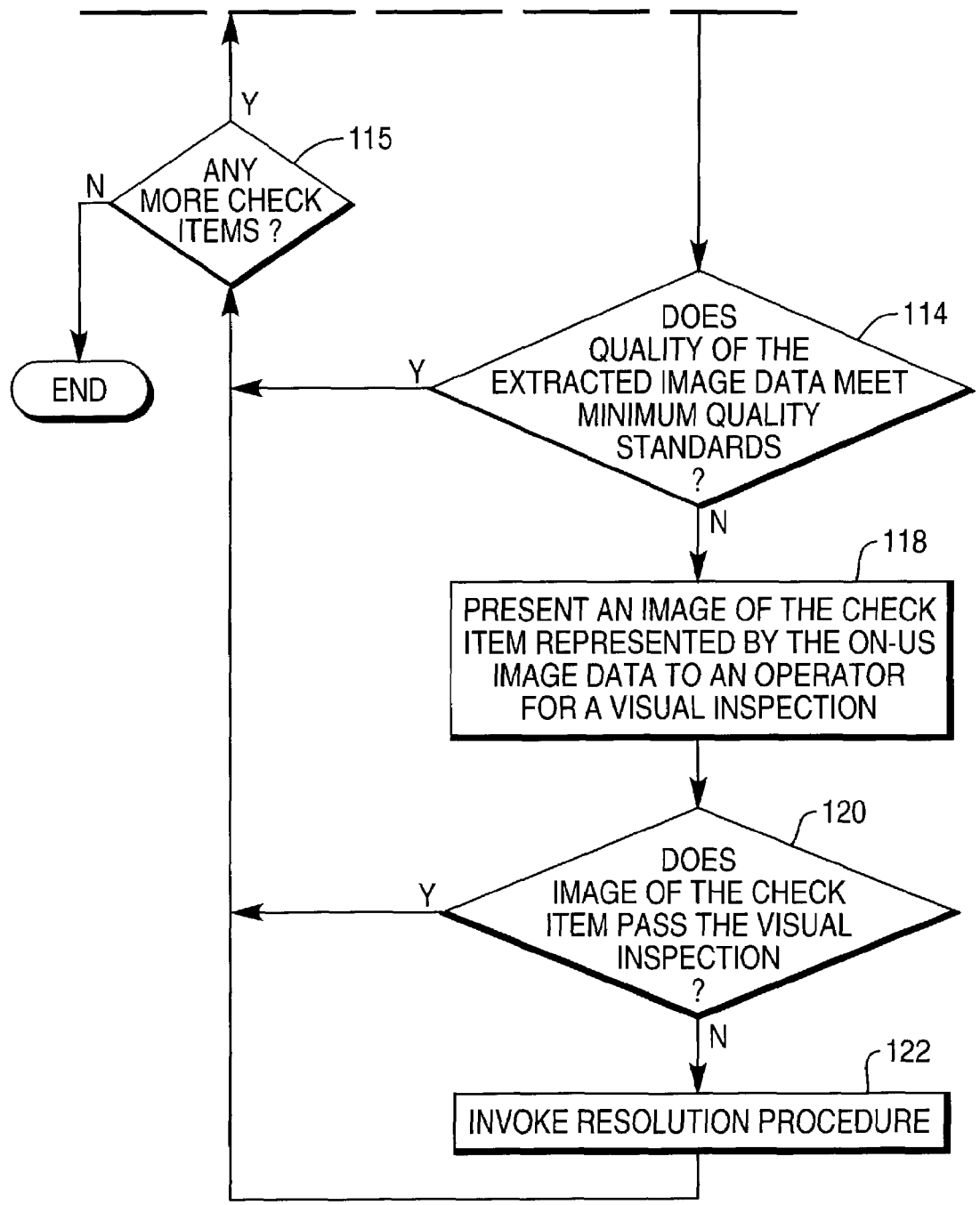

Referring to FIG. 2, a flowchart depicts operation of the process carried out by the image quality application program 100 to determine if each check image received from the sending bank is of acceptable quality for the intended use. After receiving an exchange file and the "On-Us" check image data in the ECP presentment file from the sending bank, as shown in step 102, the program proceeds to step 104 in which the account number of a check item from the exchange file is read.

Figure 3:
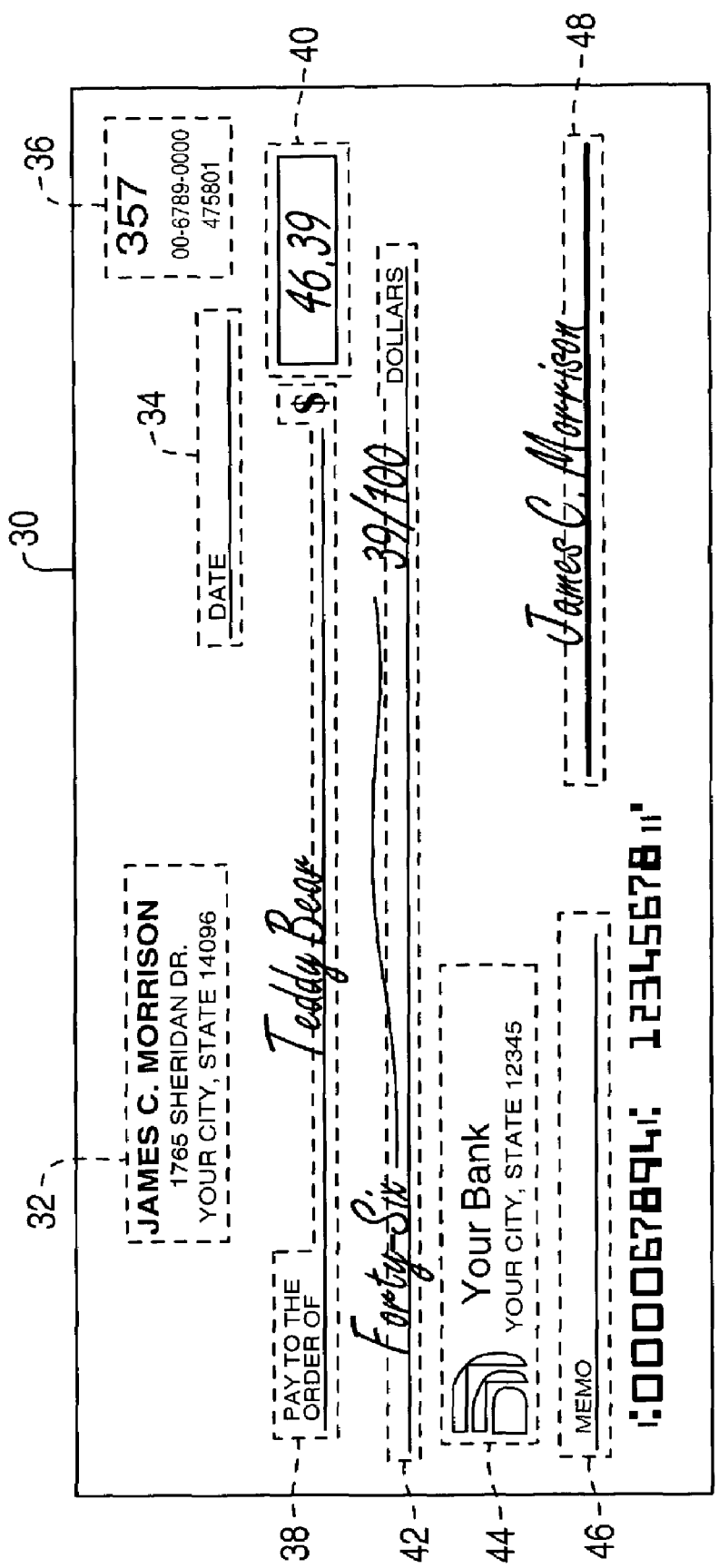
FIG. 3 is a representation of a typical check and showing certain features of the check.

Using the account number of the check item from the exchange file, apriori data which is representative of certain features of checks which have been previously issued by the receiving bank to its customers is retrieved from memory 22 (FIG. 1), as shown in step 106. The check features represented by the apriori data may include alphanumeric text and/or lines, for example, which appear on the face of a check 30, as shown in FIG. 3. The check features shown in FIG. 3 include alphanumeric text contained in a payer field 32, alphabetic text and a line contained in a date field 34, numeric text of different sizes in a check number/routing & transit number field 36 located in the upper-right corner of the check 30, a line and alphabetic text including a dollar sign symbol in a payee field 38, lines forming a rectangle in a courtesy amount field 40, a line and alphabetic text in a legal amount field 42, alphanumeric text and a logo character in a paying bank name field 44, a line and alphabetic text in a memo field 46, and a relatively thicker line in a payer signature field 48.

The alphanumeric text, characters, and/or lines contained in the different fields 32, 34, 36, 38, 40, 42, 44, 46, 48 of the check 30 are exemplary of the type of pre-printed information which is represented by the apriori data stored in the memory 22. Since the receiving bank issued the check 30 to its bank customer, the receiving bank has apriori knowledge as to the alphanumeric text, characters, and/or lines contained in the different fields 32, 34, 36, 38, 40, 42, 44, 46, 48 of the check 30, as well as the specific location of the fields on the check. Before the receiving bank issues a book of checks including the check 30 to the bank customer, the receiving bank stores the apriori data in the memory 22. The apriori data is representative of the pre-printed information on the check 30 and all of the other checks contained in the same checkbook issued to the bank customer.

After retrieving the apriori data from the memory 22 in step 106 of FIG. 2, the program proceeds to step 108 in which the check image data received from the sending bank is decompressed. After decompression, certain check image data of interest is extracted in a known manner from the decompressed image data, as shown in step 110. The program proceeds to step 112 in which the extracted image data of interest is compared with the apriori data retrieved from the memory 22.

There are many ways in which the comparison in step 112 may be accomplished. For example, the comparison may involve determining if a line and/or text is present. Alternatively, the comparison may involve determining if text is readable. As another example, the comparison may involve determining if a line and/or text is at a predetermined location, or determining if the line and/or text is of a predetermined length. The comparison may involve determining if a line is of a predetermined thickness. Still as another example, the comparison may involve determining if there is a break in a line and/or text by examining pixels. As another example, the comparison may involve determining the extent of contrast between a line and background of the line by examining gray scale values.

Based upon the comparison in step 112, a determination is made as to whether the quality of the extracted image data of interest meets minimum quality standards, as shown in step 114. If the determination in step 114 is affirmative, the program proceeds to step 115 to determine if there are any more check items to be processed. If the determination in step 115 is negative, the program terminates. Otherwise, the program proceeds to step 116 in which the next check item is retrieved from the exchange file received from the sending bank. The program returns to step 104 to process this next check item in the same manner as the previous check item as just described hereinabove.

However, if the determination in step 114 is negative, the program proceeds to step 118 in which an image of the check represented by the check image data is presented on a display for allowing an operator at the receiving bank to visually inspect the check image. Then, in step 120, if the operator determines that the image of the check passes the visual inspection, then the program proceeds to step 115 to determine if there are any more check items to be processed. If the determination in step 115 is negative, the program terminates. Otherwise, the program proceeds to step 116 in which the next check item is retrieved from the exchange file received from the sending bank. The program returns to step 104 to process this next check item in the same manner as the previous check item as just described hereinabove.

However, if the operator determines that the image of the check does not pass the visual inspection in step 120, the program proceeds to step 122 in which a resolution procedure is invoked to determine what next steps are needed. In certain instances, for example, someone of higher authority at the receiving bank may determine the check image to be acceptable even though the check image did not pass the earlier visual inspection by an operator. In other certain instances, a notification may be generated and sent to the sending bank to inform the sending bank that certain check images including the present check image has been found to be unacceptable. The resolution procedure followed will depend upon the specific processes of the receiving bank and will differ from bank to bank. The program then proceeds to step 115 to determine if there are any more check items to be processed. If the determination in step 115 is negative, the program terminates. Otherwise, the program proceeds to step 116 in which the next check item is retrieved from the exchange file received from the sending bank. The program returns to step 104 to process this next check item in the same manner as the previous check item as just described hereinabove.

It should be apparent that the above description describes a process in which the receiving bank can, with minimum human intervention, establish the quality of check images which have been electronically transferred from the sending bank. For those check images which do not meet the minimum quality standards set forth by the receiving bank or by industry standards, for example, these check images may then be forwarded to an operator for a visual inspection by the operator.

Figure 4:
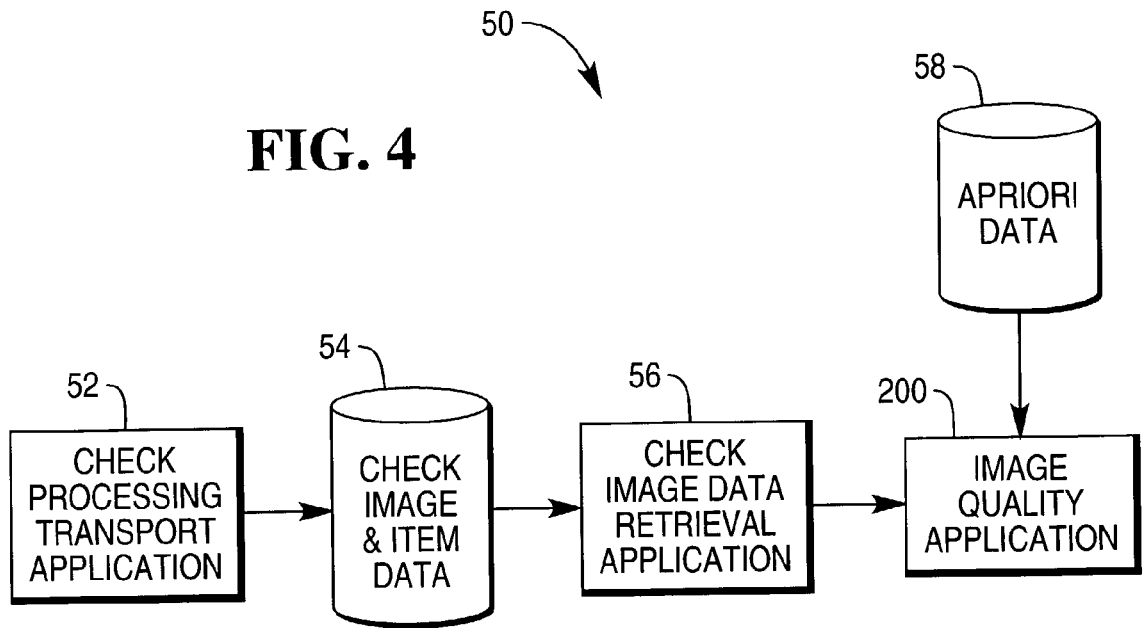
FIG. 4 is a schematic block diagram showing a check processing application which embodies the present invention.

Referring to FIG. 4, another embodiment of the present invention is shown. In this embodiment, a check processing application 50 is illustrated in which a check processing transport application 52 at a receiving bank controls a check processing transport (not shown) to process checks in a known manner to provide check image data which is representative of images of the checks which have been processed. The check image data which is representative of check images is stored in check image and item data memory 54. A check image data retrieval application 56 then retrieves check image data which is representative of check images stored in the check image data memory 54.

After check image data is retrieved from the check image data memory 54, an image quality application program 200 processes the retrieved check image data to determine if the check image data meets certain minimum quality standards. The image quality application program 200 processes the retrieved check image data from the check image memory 54 using apriori data from memory 58 in the same manner as the image quality application program 100 processes the retrieved check image data from the check image data memory 14 using the apriori data from the memory 22, as previously described hereinabove in the embodiment of FIGS. 1 and 2. The receiving bank makes the determination as to whether each check image meets a minimum quality standard to ensure that each of the physical checks received from the sending bank is of sufficient quality for the intended use before accepting the physical check from the sending bank.

Figure 5B:
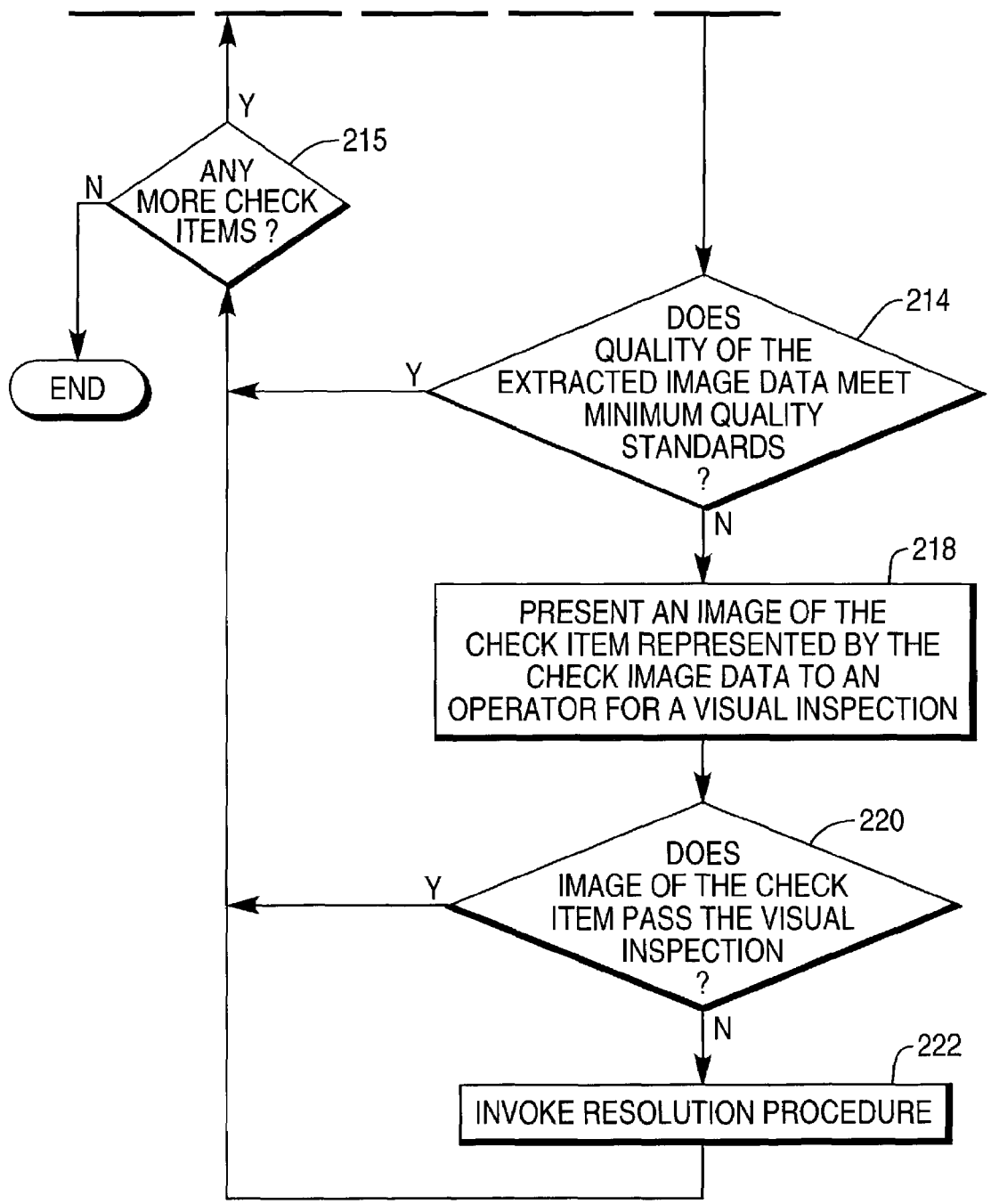
FIG. 5 is a flowchart depicting a program for providing an indication of quality of a check image in the check processing application of FIG. 4.

Referring to FIG. 5, a flowchart depicts operation of the process carried out by the image quality application program 200 to determine if the check image corresponding to each physical check received from the sending bank is of acceptable quality for the intended use. After retrieving the check image data which corresponds to the present check being processed, as shown in step 202, the program proceeds to step 204 in which the retrieved check image data is decompressed in a known manner. Then, in step 206, the account number of the check item is read from the item data stored in the check image and item data memory 54. Using the account number of the check, apriori data which is representative of certain features of checks provided by the receiving bank to its customers is retrieved from the memory 58, as shown in step 208. The check features represented by the apriori data may include alphanumeric text and/or lines which have already been described hereinabove for the check 30 as shown in FIG. 3.

The program proceeds to step 210 in which certain check image data of interest is extracted from the decompressed image data. Then, in step 212, the extracted image data of interest is compared with the apriori data retrieved from the memory 58. Based upon the comparison in step 212, a determination is made in step 214 as to whether the quality of the extracted image data of interest meets minimum quality standards. If the determination in step 214 is affirmative, the program proceeds to step 215 to determine if there are any more check items to be processed. If the determination in step 215 is negative, the program terminates. Otherwise, the program proceeds to step 216 in which check image data which represents the check image of the next check item is retrieved from the check image and item data memory 54. The program returns to step 204 to process this next check item in the same manner as the previous check item as just described hereinabove.

However, if the determination in step 214 is negative, the program proceeds to step 218 in which an image of the check represented by the check image data is presented on a display for allowing an operator to visually inspect the check image. Then, in step 220, if the operator determines that the image of the check passes the visual inspection, then the program proceeds to step 215 to determine if there are any more check items to be processed. If the determination in step 215 is negative, the program terminates. Otherwise, the program proceeds to step 216 in which check image data which represents the check image of the next check item is retrieved from the check image and item data memory 54. The program returns to step 204 to process this next check item in the same manner as the previous check item as just described hereinabove.

However, if the determination in step 220 is negative, the program proceeds to step 222 in which a resolution procedure is invoked to determine what next steps are needed. The resolution procedure followed will depend upon the particular processes of the particular bank. The program then proceeds to step 215 to determine if there are any more check items to be processed. If the determination in step 215 is negative, the program terminates. Otherwise, the program proceeds to step 216 in which the next check item is retrieved from the check image and item data memory 54. The program returns to step 204 to process this next check item in the same manner as the previous check item as just described hereinabove.

It should be apparent that the above description describes a process in which the receiving bank can, with minimum human intervention, establish the quality of check images of physical checks which have been received from a sending bank. For those check images which do not meet the minimum quality standards set forth by the receiving bank or by industry standards, for example, the check images may then be forwarded to an operator for a visual inspection by the operator.

Figure 6:
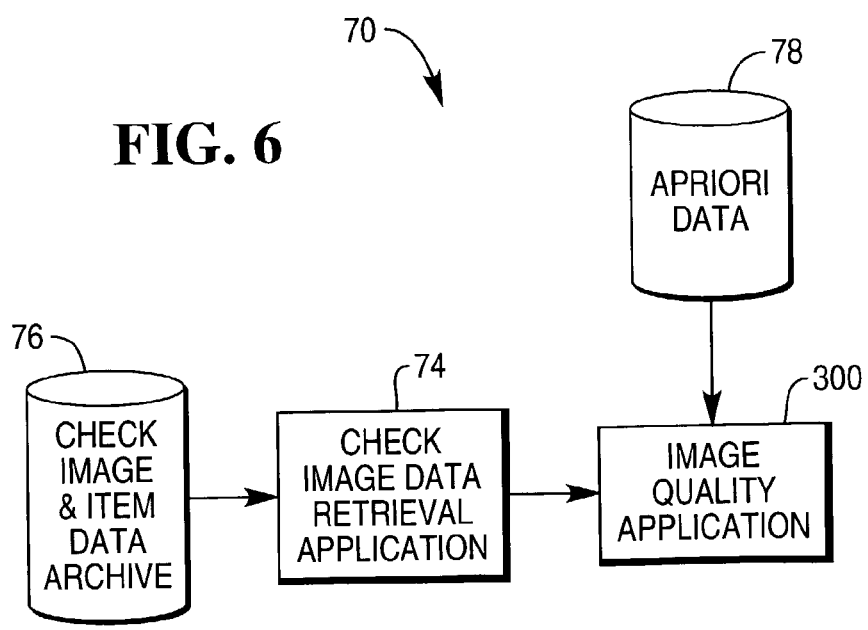
FIG. 6 is a schematic block diagram showing a check image archiving application which embodies the present invention.

Referring to FIG. 6, still another embodiment of the present invention is shown. In this embodiment, a check image archiving application 70 is illustrated in which a check image data retrieval application 74 retrieves check image data which is representative of check images stored in a check image and item data archive 76. After check image data is retrieved from the archive 76, an image quality application program 300 processes the retrieved check image data to determine if the check image data meets certain minimum quality standards. The image quality application program 300 processes the retrieved check image data from the archive 76 using apriori data from memory 78 in the same manner as the image quality application program 200 processes the retrieved check image data from the check image and item data memory 54 using the apriori data from the memory 58, as previously described hereinabove in the embodiment of FIGS. 4 and 5. The bank may retrieve the check image data associated with a particular check for a number of reasons. One reason may be for the purpose of printing the corresponding check image onto a letter to be sent to a bank customer, for example.

It should be apparent that the above description describes a process in which a bank can, with minimum human intervention, establish the quality of check images which have been stored away in long-term storage, such as the check image and item data archive 76. For those check images which do not meet the minimum quality standards set forth by the bank or by industry standards, for example, the check images may then be forwarded to an operator for a visual inspection by the operator.

An indication of quality of an image of a check is provided in each of the above-described check imaging applications. Although the above description describes three different applications embodying the present invention, it is contemplated that the indicating of quality of an image may be embodied in any type of application where quality of a document image is of concern.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of processing a check, the method comprising the steps of:
   (a) storing apriori data which is representative of certain features of the check;
   (b) receiving image data which is representative of an image of the check;
   (c) reading a pre-printed account number from a magnetic ink character recognition (MICR) codeline associated with the check image data, wherein the account number has been pre-printed on the check before issuance of the check;
   (d) retrieving the stored apriori data based upon the pre-printed account number which has been read from the MICR codeline associated with the check image data;
   (e) comparing a portion of the check image data with the retrieved apriori data; and
   (f) providing a status signal indicative of check image quality which is other than fraud of the check based upon the comparison of the portion of the check image data with the retrieved apriori data.

2. A method according to claim 1, wherein step (a) includes the step of:
   (a-1) storing apriori data which is representative of a pre-printed line contained in at least one field associated with the check, wherein the line has been pre-printed on the check before issuance of the check.

3. A method according to claim 1, wherein step (a) includes the step of:
   (a-1) storing apriori data which is representative of pre-printed alphanumeric text contained in at least one field associated with the check wherein the alphanumeric text has been pre-printed on the check before issuance of the check.

4. A method according to claim 1, wherein step (a) includes the step of:
   (a-1) storing apriori data which is representative of only pre-printed alphabetic text contained in at least one field associated with the check, wherein the alphabetic text has been pre-printed on the check before issuance of the check.

5. A method according to claim 1, wherein step (a) includes the step of:
   (a-1) storing apriori data which is representative of only pre-printed numeric text contained in at least one field associated with the check, wherein the numeric text has been pre-printed on the check before issuance of the check.

6. A method according to claim 1, further comprising the step of:
   (g) processing the status signal to alert an operator of the check image quality which is other than fraud of the check being below a predetermined threshold.

7. An apparatus for processing a check, the apparatus comprising:
   means for storing apriori data which is representative of certain features of the check;
   means for receiving image data which is representative of an image of the check;
   means for reading pre-printed account number from a magnetic ink character recognition (MICR) codeline associated with the check image date wherein the account number has been pre-printed on the check before issuance of the check;

means for retrieving the stored apriori data based upon the pre-printed account number which has been read from the MICR codeline associated with the check image data;

means for comparing a portion of the check image data with the retrieved apriori data; and means for providing a status signal indicative of check image quality which is other than fraud of the check based upon the comparison of the portion of the check image data with the retrieved apriori data.

8. An apparatus according to claim 7, wherein the storing means includes means for storing apriori data which is representative of a pre-printed line contained in at least one field associated with the check, wherein the line has been pre-printed on the check before issuance of the check.

9. An apparatus according to claim 7, wherein the storing means includes means for storing apriori data which is representative of pre-printed alphanumeric text contained in at least one field associated with the check, wherein the alphanumeric text has been pre-printed on the check before issuance of the check.

10. An apparatus according to claim 7, wherein the storing means includes means for storing apriori data which is representative of only pre-printed alphabetic text contained in at least one field associated with the check, wherein the alphabetic text has been pre-printed on the check before issuance of the check.

11. An apparatus according to claim 7, wherein the storing means includes means for storing apriori data which is representative of only pre-printed numeric text contained in at least one field associated with the check, wherein the numeric text has been pre-printed on the check before issuance of the check.

12. An apparatus according to claim 7, further comprising means for processing the status signal to alert an operator of check image quality which is other than fraud of the check being below a predetermined threshold.

13. A method of providing an indication of document image quality which is other than fraud of a document, the method comprising the steps of:
   (a) storing apriori data which is representative of a line contained in at least one field associated with the document;
   (b) receiving image data which is representative of the image of the document;
   (c) reading a pre-printed account number from a magnetic ink character recognition (MICR) codeline associated with the document image data, wherein the account number has been pre-printed on the check before issuance of the check
   (d) retrieving the stored apriori data based upon the pre-printed account number which has been read from the MICR codeline associated with the document image data;
   (e) comparing a portion of the document image data with the retrieved apriomi data;
   (f) providing a status signal indicative of document image quality which is other than fraud of the document based upon the comparison of the portion of the document image data with the retrieved apriori data; and
   (g) processing the status signal to alert an operator of the document image quality which is other than fraud of the document being below a predetermined threshold.

14. An apparatus for providing an indication of document image quality which is other than fraud of a document, the apparatus comprising:

means for storing apriori data which is representative of alphanumeric text contained in at least one field associated with the document;

means for receiving image data which is representative of the image of the document;

means for reading an a pre-printed account number from a magnetic ink character recognition (MICR) codeline associated with the document image data, wherein the account number has been pre-printed on the check before issuance of the check;

means for retrieving the stored apriori data based upon the pre-printed account, number which has been read from the MICR codeline associated with the document image data;

means for comparing a portion of the document image data with the retrieved apriori data;

means for providing a status signal indicative of the document image quality which is other than fraud of the document based upon the comparison of the portion of the document image data with the retrieved apriori data; and means for processing the status signal to alert an operator of the document image quality which is other than fraud of the document being below a predetermined threshold.

* * * * *